Patented Aug. 11, 1936

2,050,370

UNITED STATES PATENT OFFICE 2,050,370

HIGH MOLECULAR PRODUCTS CONTAINING SULPHUR IN COMBINATION

Ludwig Orthner, Leverkusen-I. G.-Werk, and Wilhelm Becker, Cologne-Mulheim, Germany, assignors to I. G. Farbenindustrie Aktiengesellschaft, Frankfort-on-the-Main, Germany No Drawing. Application February 19, 1935, Serial No. 7,302. In Germany February 21, 1934

9 Claims. (Cl. 260—17)

The present invention relates to new high molecular products containing sulphur in combination and the process of preparing the same.

High molecular substances resulting from the interaction of soluble sulphides particularly alkali metal polysulphides with organic compounds containing methylene groups which are linked to negative radicals, for instance, ethylene dichloride, are known to exhibit properties resembling those of leather or natural rubber. These products are practically insoluble in aliphatic and aromatic hydrocarbons and can in consequence thereof, only be employed for the preparation of molded articles such as oil pipes and so on. The chief disadvantage inherent to these products lies in their disagreeable odor which can be such as to prevent the practical use of the same. The unpleasant odor is probably due to the presence of easily volatile by-products which moreover give rise to the formation of pores and blisters in the vulcanizates obtainable by heating the products. Attempts at the removal of these easily volatile impurities encounter great difficulties owing to their tough and strongly coherent form.

Our present invention is concerned with new high molecular products resulting from the interaction of water soluble sulphides selected from the group consisting of alkali metal, ammonium and alkaline earth metal sulphides, particularly polysulphides, with aromatic compounds having at least two halogen atoms in aliphatic side-chains. Our new compounds are prepared in a manner known per se by causing interaction between sulphides and halogen compounds of the character described in the presence of diluents, particularly water or alcohol. The reaction can be accelerated by the application of higher temperatures such as up to about 100° C. though heating of the mixture can be dispensed with in some cases owing to the heat involved during the reaction. When working in the presence of water, emulsifying agents, such as sodium diisobutylnaphthalene sulphonate, condensation products of fatty acids with aliphatic amino alkyl sulphonic acids, condensation products of oleic acid chloride with amino carboxylic acids such as hydrolyzed albumen may be added; another preferred form of our invention resides in the carrying out of the reaction in the presence of water while adding superficially active solid dispersing agents such as freshly precipitated barium sulphate, magnesium hydroxide or aluminium silicate. Working in the presence of the said emulsifying agents or dispersing agents effects that the condensation products are obtained in form of a latex-like emulsion or suspension which can easily be purified and worked up in a manner similar to that customarily employed in the natural rubber industry.

The preferred sulphides employed in our present process are polysulphides, the hardness of the products being increased with an increase of the sulphur content. As other reaction components there may be mentioned aromatic compounds of the benzene, naphthalene or diphenyl series which contain at least two halogen atoms in aliphatic side-chains particularly those of the methane series. Examples for compounds of the character described are benzalchloride, benzotrichloride, dichloromethylnaphthalene, para-dichloromethylbenzene, orthodichloro m e t h y l - benzene, dichloromethylmetsitylene p-p'-dichloromethyldiphenyl, it being understood that the aromatic nuclei may be substituted by alkyl-, aralkyl, halogen- or nitrogroups.

Depending on the reaction conditions, on the nature of the halogenated compounds and the sulphur content of the sulphides our new products represent plastic to thermoplastic or rubber-like products which are free from a disagreeable smell. They are generally insoluble in aliphatic hydrocarbons and soluble in aromatic hydrocarbons. Owing to their solubility in the latter they can be employed for lacquer purposes either alone or in combination with other lacquer forming compounds such as chlorinated rubber in order to improve the resistance towards water thereof. Due to their thermoplastic nature our new compounds can, furthermore, be employed for the preparation of molded articles of an excellent resistance towards acids and other chemically active substances, for instance, as filling mass in the preparation of accumulators. The new products obtainable in accordance with our present invention are furthermore capable of being cured in a manner similar to that employed in the vulcanization of natural rubber, and yield leather to rubber-like products which are practically free from pores and blisters. As in the formation of our condensation products the halogen atoms are eliminated and the free bonds formed thereby combine with the sulphur of the sulphides, our products can be defined as "additive sulphides of alkylenes which contain aromatic nuclei."

The invention is illustrated by the following examples without being limited thereto, the parts being by weight:—

*Example 1.*—240 parts of crystallized sodium sulphide are melted on the water bath with 120 parts of sulphur and heated to boiling for 6 hours after addition of 120 parts of water and 161 parts of benzalchloride. The precipitating condensation product is washed with water and then treated with water vapor. 230 parts of a plastic condensation product are obtained, which is unsoluble in benzine, however, soluble in benzene.

*Example 2.*—130 parts of benzotrichloride are added to the equal quantity of a polysulphide solution obtained as described in Example 1 and are heated to boiling for 10 hours. The resulting mass shows thermoplastic properties.

*Example 3.*—82,5 parts of o-xylylendichloride are added to 600 parts of a polysulphide solution obtained as described in Example 1 and heated to boiling whereby the added o-xylylendichloride is melted. 125 parts of a thermoplastic mass of properties similar to those of the product described in Example 1 are obtained.

*Example 4.*—500 parts of crystallized sodium sulphide are melted with 250 parts of sulphide, 450 parts of water and 15 parts of diisopropylnaphthalene sodium sulphate and 45 parts of glue are added thereto. While strongly stirring benzalchloride and benzotrichloride 150 parts of each are added to this solution. The emulsion thus obtained is then heated for ten hours to 70–80° C. The condensation product is salted out from this suspension and then subjected to a water vapor distillation for purifying it.

*Example 5.*—50 parts of chlorinated rubber are dissolved after addition of 10 parts of chlorinated diphenyl and 10 parts of a condensation product obtained as described in Example 1 in a mixed solvent consisting of 50 parts of toluene and 100 parts of xylene. A clear film is obtained from this solution which is distinguished by its good adhering properties.

*Example 6.*—20 parts of crepe rubber and 20 parts of a condensation product described in Example 1 are mixed on the roll with 4 parts of zinc white, 10 parts of carbon black, 0.5 part of stearic acid, 0.8 part of sulphur and 0.4 part of mercaptobenzothiazol. After vulcanization for 60 minutes and at a pressure of 2 atmospheres a vulcanizate is obtained, which is far superior to the vulcanized mixtures of natural rubber with regard to the swelling capacity in benzine and mineral oils.

If a synthetic rubber such as mixed polymerizate of butadiene and acrylic acid nitrile are employed instead of natural rubber in the mix a vulcanizate is obtained which is also eminently resistant towards benzine and mineral oils.

We claim:

1. The process which comprises causing interaction between water soluble sulphides selected from the group consisting of alkali metal, ammonium and alkaline earth metal sulphides and aromatic compounds having at least two halogen atoms in aliphatic side-chains.

2. The process as claimed in claim 1, in which the water soluble sulphide is a polysulphide.

3. The process which comprises causing interaction between water soluble sulphides selected from the group consisting of alkali metal, ammonium and alkaline earth metal sulphides and aromatic compounds having at least two halogen atoms in aliphatic side-chains, the reaction being performed in an aqueous medium in the presence of an emulsifying agent.

4. The process which comprises causing interaction between a water soluble polysulphide selected from the group consisting of alkali metal, ammonium and alkaline earth metal polysulphides and benzalchloride.

5. The process which comprises causing interaction between a water soluble polysulphide selected from the group consisting of alkali metal, ammonium and alkaline earth metal polysulphides and benzotrichloride.

6. The compounds which are substantially identical with those obtainable by the process which comprises causing interaction between water-soluble sulphides selected from the group consisting of alkali metal, ammonium and alkaline earth metal sulphides and aromatic compounds having at least two halogen atoms in aliphatic side-chains.

7. The compounds which are substantially identical with those obtainable by the process which comprises causing interaction between water-soluble polysulphides selected from the group consisting of alkali metal, ammonium and alkaline earth metal polysulphides and aromatic compounds having at least two halogen atoms in aliphatic side-chains.

8. The compounds which are substantially identical with those obtainable by the process which comprises causing interaction between a water soluble polysulphide selected from the group consisting of alkali metal, ammonium and alkaline earth metal polysulphides and benzalchloride.

9. The compounds which are substantially identical with those obtainable by the process which comprises causing interaction between a water-soluble polysulphide selected from the group consisting of alkali metal, ammonium and alkaline earth metal polysulphides and benzotrichloride.

LUDWIG ORTHNER.
WILHELM BECKER.

DISCLAIMER 2,050,370.—*Ludwig Orthner*, Leverkusen-I. G.-Werk, and *Wilhelm Becker*, Cologne-Mulheim, Germany. HIGH MOLECULAR PRODUCTS CONTAINING SULPHUR IN COMBINATION. Patent dated August 11, 1936. Disclaimer filed February 12, 1938, by the assignee, *I. G. Farbenindustrie Aktiengesellschaft*.

Hereby enters this disclaimer to claims 1, 2, 3, 6, and 7 in said specification.

[*Official Gazette March 8, 1938.*]